(12) United States Patent
Smith et al.

(10) Patent No.: US 8,201,239 B2
(45) Date of Patent: Jun. 12, 2012

(54) EXTENSIBLE PRE-BOOT AUTHENTICATION

(75) Inventors: Ned Smith, Beaverton, OR (US);
Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 944 days.

(21) Appl. No.: 12/214,830

(22) Filed: Jun. 23, 2008

(65) Prior Publication Data
US 2009/0319806 A1    Dec. 24, 2009

(51) Int. Cl.
*G06F 21/00* (2006.01)
(52) U.S. Cl. .......................................... 726/16; 713/189
(58) Field of Classification Search .................. 713/193, 713/1, 2, 187, 189; 726/17–21
See application file for complete search history.

(56) References Cited

U.S. PATENT DOCUMENTS

| 7,103,529 B2 | 9/2006 | Zimmer | 703/27 |
| 2003/0023812 A1* | 1/2003 | Nalawadi et al. | 711/118 |
| 2005/0021968 A1* | 1/2005 | Zimmer et al. | 713/176 |
| 2005/0144609 A1* | 6/2005 | Rothman et al. | 717/168 |
| 2008/0120499 A1 | 5/2008 | Zimmer et al. | 713/2 |
| 2009/0067685 A1* | 3/2009 | Boshra et al. | 382/124 |
| 2009/0172381 A1* | 7/2009 | Zimmer et al. | 713/2 |
| 2010/0023782 A1* | 1/2010 | Prakash et al. | 713/193 |

OTHER PUBLICATIONS

U.S. Appl. No. 11/897,355, filed Aug. 30, 2007, entitled "Method for Firmware Isolation," by Jiewen Yao, et al.
U.S. Appl. No. 12/156,223, filed May 30, 2008, entitled "Enabling Byte-Code Based Image Isolation," by Jiewen Yao, et al.

* cited by examiner

*Primary Examiner* — Gilberto Barron, Jr.
*Assistant Examiner* — David Le
(74) *Attorney, Agent, or Firm* — Trop, Pruner & Hu, P.C.

(57) ABSTRACT

In one embodiment, the present invention includes a method for obtaining a pre-boot authentication (PBA) image from a full disk encryption disk in a pre-boot environment, executing the PBA using a chipset to obtain user credential information, authorizing the user based on the user credential information and stored credential information, and storing the user credential information in a PBA metadata region of the disk. Other embodiments are described and claimed.

20 Claims, 5 Drawing Sheets

EXTENSIBLE PRE-BOOT AUTHENTICATION

BACKGROUND

To improve security of computer systems, various efforts have been made in both hardware and software to lock down a system and ensure that unauthorized access is not permitted. One such effort is full disk encryption (FDE), in which virtually all data stored on a disk is encrypted.

In a pre-boot environment, Unified Extensible Firmware Interface (UEFI) code in accordance with the UEFI Specification Version 2.0 (dated Feb. 21, 2006) or later revision, which calls for the separation of pre-boot and boot environments into a variety of phases, may execute before handoff to an OS. Many FDE schemes require some pre-operating system (OS) user authentication. But this user-authentication cannot wholly occur in the OS since the OS image is itself encrypted. As such, a rich plurality of authentication tokens/credentials and credential providers need to be hosted in this pre-OS regime. In some systems, a different OS, e.g., Linux™, is launched in the pre-OS space to perform the user authentication. However, this pre-OS launch of a different OS is typically outside of the UEFI specification. Further, this pre-OS launch then needs to return to the platform basic input/output system (BIOS) (UEFI or legacy) and continue to the main OS boot. This is a huge impediment to boot time, is a large storage overhead, and effectively entails duplication of many platform BIOS capabilities.

DETAILED DESCRIPTION

Embodiments may enable a platform to provide an extensible pre-boot authenticator (PBA) that can interact with security enhancements, such as a full disk encryption (FDE) scheme. Embodiments allow for conjoining chipset-hooks and capabilities with UEFI pre-OS and runtime flows to have a high-assurance implementation of FDE.

In one embodiment, security firmware, which may be present within a chipset or other system component, can perform isolated, access-controlled storage for provisioning UEFI PBA executables in-band and out-of-band via a manageability engine (ME), and a remote web-services networking capability. A virtualization engine (VE) in the chipset provides for a trusted path via console input virtualization and output via a trusted sprite.

Various devices and other ingredients may contribute to enable different embodiments. First a user identity manager or other UEFI driver may be used to manage the process of determining the user's identity and storing information about the user. A user enrollment manager is an application that adds or enrolls new users, gathering the necessary information to ascertain their identity in the future. A credential provider driver manages a single class of credentials. Examples include a Universal Serial Bus (USB) fingerprint sensor, a smart card or a password.

The implementation of these drivers can have defaults which use platform resources, such as flash memory, to store pre-shared keys (PSK's), such as hashes of passwords, and can include standard USB tokens that adhere to profiles, such as USB mapping for smart cards. The same holds true for consoles. A simple input protocol can be implemented on top of a standard USB interface, a keyboard, or other device, and the text output can be sent to a video graphics adaptor (VGA) or to another console, such as an integrated graphics frame buffer. In other implementations, the same application programming interfaces (APIs) can be published on top of accessors to a virtualization engine controller interface (VECI) in order to have access to integrated credential providers and a trusted path for the input and output console.

Figure 1:
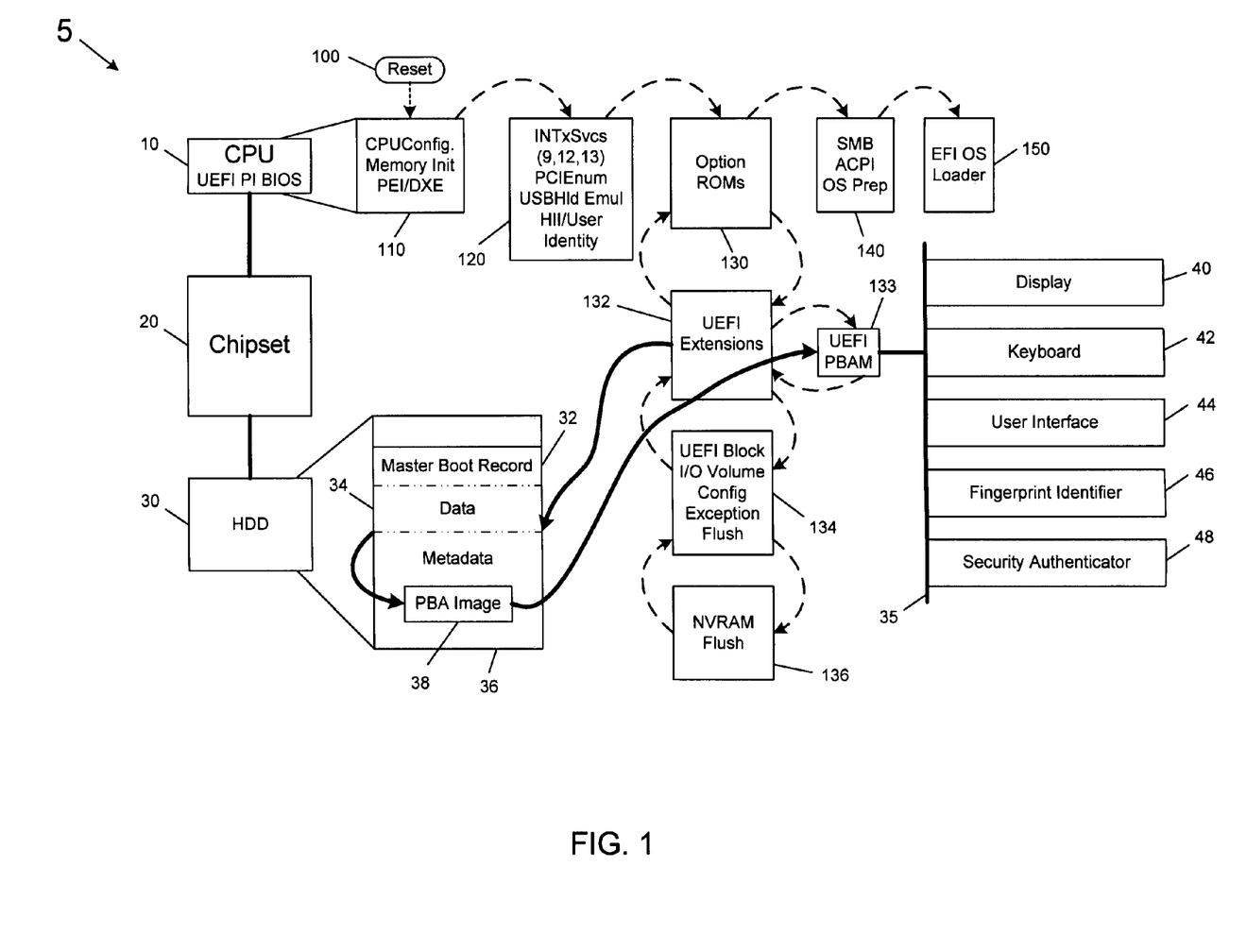
FIG. 1 is a boot flow diagram for booting in a system in accordance with one embodiment of the present invention.

Referring now to FIG. 1, shown is a boot flow diagram for booting a system in accordance with one embodiment of the present invention. As shown in FIG. 1, a system 5 includes various hardware resources, including a processor 10 such as a central processing unit (CPU). A chipset may be coupled to processor 10. Specifically, chipset 20 may be one or more integrated circuits to interface with system memory, peripherals and so forth. One such component to which chipset 20 is coupled is a non-volatile storage 30, which may be a hard drive in which data may be encrypted using full data encryption (FDE). That is, chipset 20 may encrypt all data resident in storage 30. As further shown in FIG. 1, a layout of storage 30 includes a master boot record 32, data 34, and a metadata storage 36 which in one embodiment may be unencrypted (i.e., not using FDE) metadata associated with various secure operations. Various data may be stored in metadata region 36, including a pre-boot authentication (PBA) image 38. A host connect interface (HCI) may through a BIOS driver, provide access to security resources such as PBA image 38 that is stored in metadata storage 36, which may be a hidden partition of storage 30. Note that this portion is not encrypted using full disk encryption, although the data may be encrypted in another manner.

FIG. 1 further shows additional hardware that may be present in a system, including a display 40, a keyboard 42, a user interface 44 such as a mouse or other device, a fingerprint identifier 46, and a security authenticator 48, all of which may be coupled to chipset 20 via a trusted path 35.

As will be discussed further below, user input such as credential information, e.g., passwords, fingerprints, other codes and so forth, may be input via these user interfaces and provided via trusted path 35 to chipset 20, e.g., during pre-boot authorization activities.

FIG. 1 further shows a flow diagram for booting of system 5 in a UEFI environment in accordance with one embodiment of the present invention. As shown in FIG. 1, at a reset event 100, a host root of trust is established and various configuration and initialization operations may be performed using various code executed by processor 10. Such code may include a pre-EFI initialization environment (PEI) in which code minimal processor, chipset and platform configuration is performed to support memory discovery. Then a driver execution environment (DXE) phase may be performed in which firmware code may operate in the pre-boot environment, and that can be implemented as multiple drivers to complete initialization of the platform and devices. For example, device, bus or service drivers may be executed responsive to dispatch by a DXE dispatcher. Control thus passes to a pre-EFI/Architecture Driver Execution Environment (PEI/DXE) phase 110, which in turn initiates various enumeration and identification processes 120. Note that in some embodiments, a DXE driver invokes a trusted execution technology (TXT) to do a trusted load and a trusted hand off of execution and that would prevent an untrusted boot kit from being able to mask a legitimate pre-boot authentication module.

After such operations one or more option read-only memories (ROMs) 130 may be enabled which may execute various EFI drivers and extensions, including a UEFI security extension 132. As shown, this code may obtain PBA image 38 and execute a PBA module (PBAM) 133 to obtain the user input such as authorization information, credential information and so forth. The image may compare this information to stored credential information to determine whether to authorize the user. Further, the received user credential information may be stored in a given storage, such as metadata storage 36. PBAM 133 may thus act as a collector to collect authentication values via an interface to a user (e.g., fingerprint, password, or so forth), and to pass the same to, e.g., secure firmware present in the chipset, which then evaluates the data based on an expected value. Upon successful authentication, the firmware can decrypt the metadata which essentially wraps the disencryption keys to allow communication between the chipset and a given device such that normal advanced host controller interface (AHCI) processing can occur. When the PBA image is read from the disk, the security firmware will verify an integrity check value. In this way, a threat of a drive being inserted into another platform can be prevented.

Then the normal PBA code can run to authenticate the user and pass that information to security firmware. Then a secure exit can be performed to return to the regular environment to continue a bootstrap to the OS loader. Additional operations such as various UEFI block input/output (IO) operations 134 may be performed and a flush of non-volatile random access memory (NVRAM) 136 may be performed. After successful initiation of option ROMs, control passes to block 140 for further pre-OS operations such as enabling of a system management BIOS (SMB) and an Advanced Configuration and Power Interface (ACPI), and preparing for an OS load. Finally, if all such events are successful, a normal boot may occur via an EFI OS loader 150. While shown with this particular implementation in the embodiment of FIG. 1, the scope of the present invention is not limited in this regard.

Figure 2:
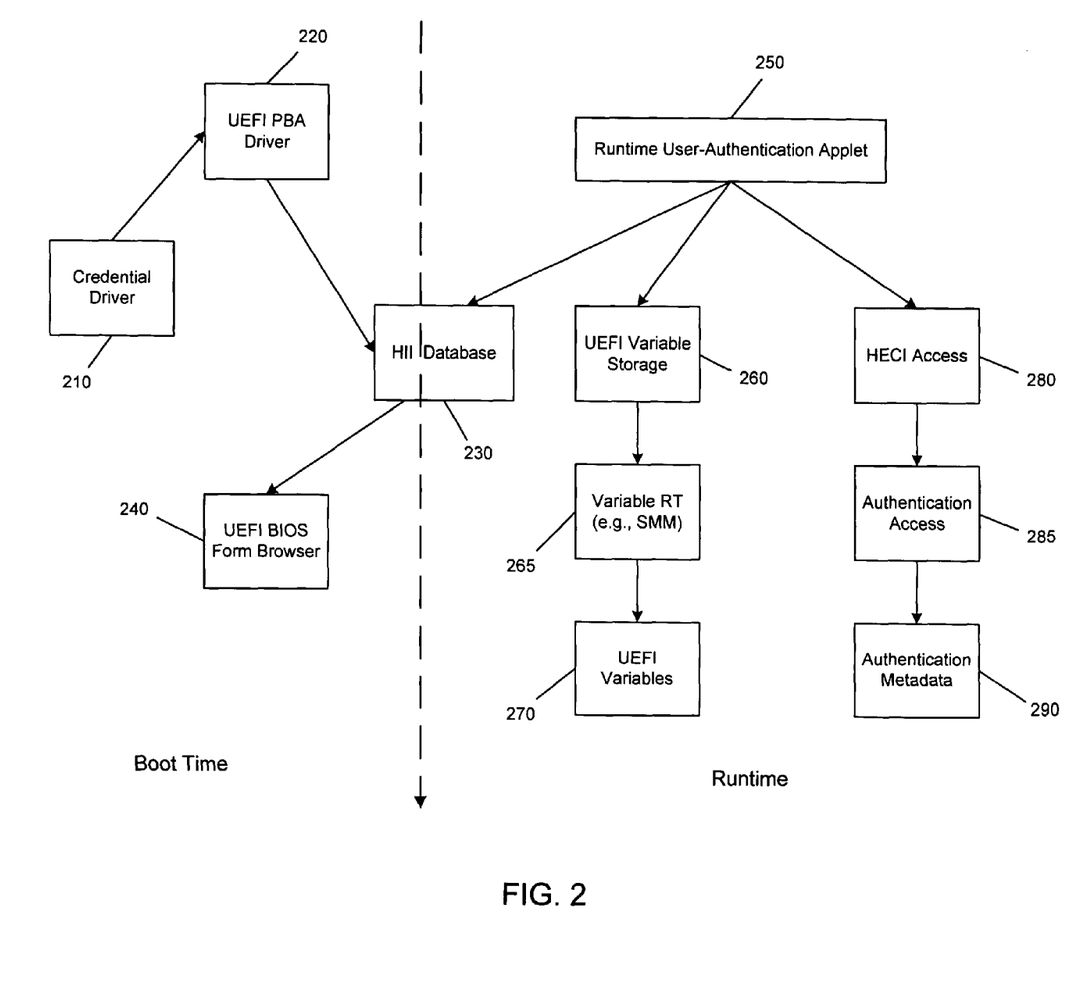
FIG. 2 is a block diagram of a model for EFI access at runtime in accordance with one embodiment of the present invention.

Referring now to FIG. 2, shown is a block diagram of a model for EFI access at runtime. As shown in FIG. 2, at block 210 credential drivers are published. These can be standard UEFI drivers that use a UEFI USB stack or drivers that use a VECI to communicate with hardware, e.g., via a virtualization engine (VE), as will be described below. These drivers will expose the same protocol so that various pre-boot authenticators (PBAs) can access these hardware capabilities. At block 220, various PBAs (e.g., UEFI PBA drivers) are executed that can expose a set of questions and manage user credentials into the platform. In UEFI, presentation management is under control of BIOS (i.e., they manage their own 'look and feel', etc) so the PBA's will post UEFI host information (HII) forms obtained from a HII database 230 with internationalization-friendly strings and questions. The platform "browser" will expose the user-authentication questions to the user, as shown at block 240. In one embodiment, console drivers published on a system use a trusted path, namely simple-input protocol and graphics output protocols, respectively, to be abstracted to the browser via drivers that have a trusted path via the VECI into a chipset. Note that the actual user-interaction with the system can be at a local console or via an actively managed-hosted remote session (e.g., a keyboard, video mouse controller). This user-authentication may thus enable high-security in FDE.

The above blocks 210-240 represent the conjunction of the UEFI-hosted PBA and a trusted path. Note that the drivers can be provisioned into the file allocation table (FAT) partition of the metadata with protected UEFI driver load list variables. This will allow for addition of successive credential providers and PBA's after an original equipment manufacturer (OEM) ships the system (i.e., under information technology (IT) authority). This hosted driver store will also allow for out-of-band (OOB) provisioning of these drivers by IT remotely, as will be described below. Driver provisioning from a hidden disk range controlled by firmware in a manageability engine (ME) as well as driver context sharing is described in more detail below.

At runtime after booting, a single-sign on (SSO) usage model can be realized. Therein, some of the pre-OS user information can be passed into the OS runtime. The UEFI standard for user identification only stipulates the pre-OS API's (i.e., "protocols" in UEFI parlance). The passing of proof information beyond pre-OS is not treated. As such, the ability to proxy this information into an OS runtime and have an OS driver that opaquely accesses either the proof information via UEFI protected variables or via access to protected metadata via a VECI is possible.

Thus as shown in FIG. 2, during runtime, a user authentication applet 250 may execute and which can access UEFI variable storage 260, runtime variables 265 such as system management mode (SMM) data, and UEFI variables 270. Still further, applet 250 may perform a HECI access 280 to retrieve and/or provide authentication access 285 to authentication metadata 290, which may be stored in the hidden disk partition, as discussed above.

Figure 3:
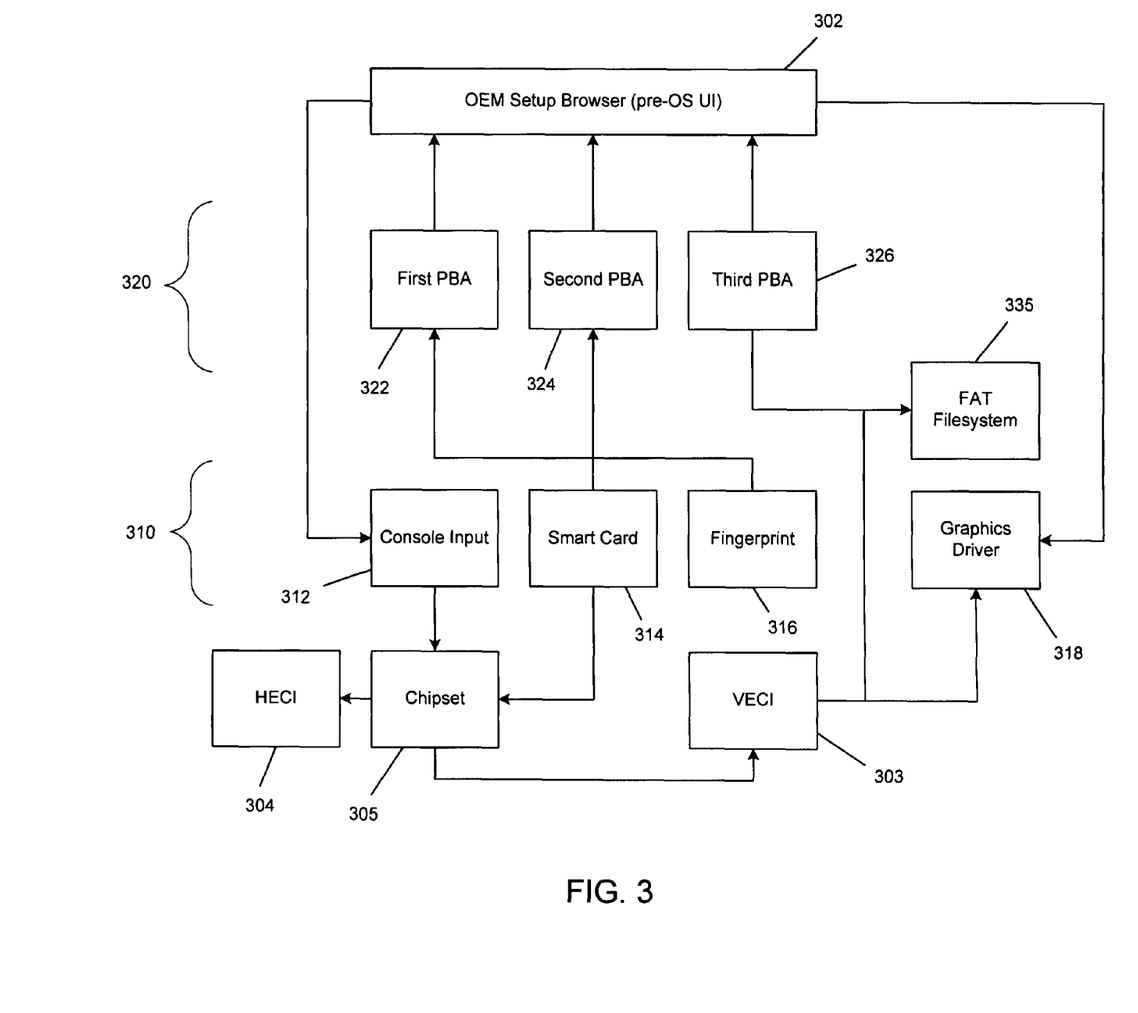
FIG. 3 is a block diagram showing linkages to firmware with EFI service and device drivers in accordance with one embodiment of the present invention.

FIG. 3 is a block diagram showing linkages to ME and VE firmware with EFI service and device drivers layered on top of hardware interfaces. Here a device layer 310 supports authentication via vendor specific devices such as fingerprint scanners, smart card readers and more traditional keyboard/ graphics for password authentication. Device layer 310 interfaces to hardware such as a chipset 305 using a VE command interface (VECI) 303. A VE of chipset 305 is a data channel that can be virtualized in firmware such that physical authentication devices can be implemented with "trusted path" attributes, namely the VE can establish an authenticated data path between physical device and chipset firmware that is not spoofable by bus monitoring hardware or software. The VE may also enable/disable features of a physical device that IT personnel determines are desirable/undesirable according to their security policy. Therefore, vendor authentication devices can become more trustworthy to IT because of VE in chipsets. In EFI, access to VE-enabled devices for authentication is via EFI device drivers that do not require special instrumentation in order to work with VE, however VE aware EFI device drivers can report trusted-path security attributes to PBA modules to allow users the option of selecting more secure and trustworthy authentication devices.

As shown in the embodiment of FIG. 3, such vendor authentication devices can include console input 312, a smart card 314, a fingerprint scanner 316 and a graphics driver 318. As shown in FIG. 3, each of these devices can communicate with various other components via interfaces to a pre-OS user interface 302, which may be a given OEM setup browser, communication to a given one of PBAs 322, 324, and 326, and/or to chipset 305. For example, communication from a user to the console input 312 may be by a simple text input protocol or to graphics driver 318 via a graphics output protocol. In turn, the information to be shown to a user may be published by PBAs 322-326 via HII forms to user interface 302. Other protocols may also be used. For example, an EFI_USER_CREDENTIAL_PROTOCOL may be used to communicate fingerprint information from fingerprint scanner 316 to first PBA 322, and a USB_HC_PROTOCOL may be used to communicate information from console input 312 to chipset 305. Still further, communications between chipset 305 and HECI interface 304 may be via a given HECI protocol, while communications between chipset 305 and VECI interface 303 may be via a given HECI or VECI protocol. As further shown in FIG. 3, a file allocation table (FAT) file system 335 may be in communication with third PBA 326 to receive information from third PBA 326.

The layer above the device layer is the service driver layer 320. Service layer 320 contains PBA building blocks components that may be called by a controlling PBA module. However, flexibility exists in the architecture for a service driver to operate independently of a controlling PBA application. For example, a complete authentication challenge protocol can be performed stand-alone. Service driver layer 320 modules necessarily can call into a ME of chipset 305 via a host embedded controller interface (HECI) 304 or control channel side of chipset 305 where embedded capabilities can be leveraged. For example, user account metadata can become active only when a given service driver (or other PBA) successfully produces authentication credentials that unlocks account data. Still other ME firmware can manage enterprise user account state; having the ability to interact with enterprise identity management servers (especially over ME Common Services out-of-band (OOB) channel) such that enterprise-managed users can maintain up-to-date account metadata within the ME. An EFI PBA module therefore does not need to be updated in order to respond to remotely applied user account changes.

Service driver modules can be highly specialized modules that focus on a particular class of authentication or recovery protocol. Other service drivers or a controlling PBA module can leverage this specialized behavior by invoking specific interfaces (that may be proprietary or standard). In some embodiments, server drivers may be called from an OS-present mode (see FIG. 2) such that users may re-authenticate or authenticate with additional factors while still retaining full features contained in PBA modules. This is achieved by leveraging EFI framework. By leveraging this capability for authentication, IT can maintain a consistent authentication scheme across pre and post-boot environments.

Thus in various ME platforms with security technology, a portion of unprotected but hidden metadata can be exposed to the EFI. This metadata is not directly accessible via the VE or EFI drivers. It can only be accessed via a secure host controller interface. Embodiments thus can enforce an access control policy that is specific to pre-boot authentication requirements. For example, a third party PBA vendor can use this metadata area to store a copy of their PBA and have it be called from the pre-boot PBA environment even through the third party module was not included in the BIOS flash region by the OEM.

Figure 4:
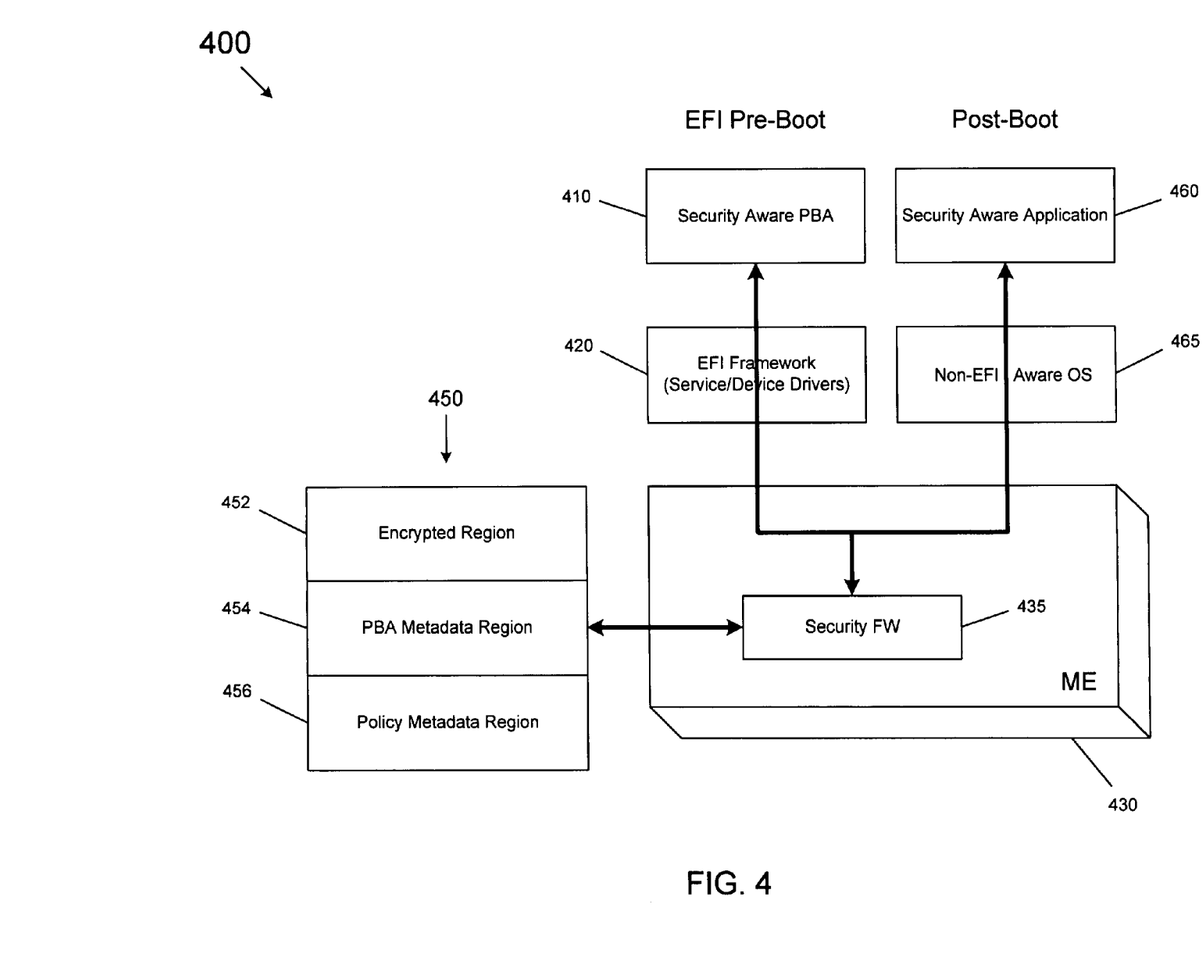
FIG. 4 is a block diagram of post-boot context management in accordance with one embodiment of the present invention.

Referring now to FIG. 4, shown is a block diagram of post-boot context management in accordance with one embodiment of the present invention. In FIG. 4, a security aware application 410 (either EFI or legacy BIOS) establishes a pre-boot authentication context. This context is communicated across the pre-post-boot boundary through an EFI framework 420 (e.g., service/device drivers such as shown in FIG. 3) which communicates with a manageability engine (ME) 430, which may be of a chipset or other component in communication with a hard disk drive (HDD) 450, which may be a FDE drive having an encrypted region 452. This context is saved into an unencrypted but hidden (to non-security aware applications) in a PBA metadata region 454 of HDD 450 that is under the control of security firmware 435.

After the platform transitions to post-boot, a non-EFI aware OS 465 is launched. EFI facilities are not available post-boot either because EFI was dismantled as part of a BIOS legacy compatibility mode operation or because the OS is not able to invoke EFI post-boot interfaces. During runtime, a security aware application 460 is able to obtain the pre-boot PBA context by issuing a call, which may be performed after a re-authorization of the user. The call may generate a read command that produces the pre-boot context previously saved by the security-aware PBA module 410. Thus the post-boot PBA may perform administrative or operational tasks based on the PBA context even though the OS is not EFI aware.

It is also possible for a post-boot agent to affect the state and operation of the PBA (i.e., next time the system boots) by reversing the direction of the steps outlined above, which may store revised or updated policy metadata in a policy metadata region 456 of hard drive 450. Hence, the PBA can read context from a previously executed post-boot agent. This may be useful when post-boot authentication is performed that results in the user credentials being modified or policy affecting how the user is authenticated impacts PBA logic. For example, a password strength policy can be provided by a remote agent to provision both a PBA image and the password policy, e.g., via an OOB channel to a chipset ME. In this way, the security firmware can apply the policies and write the policies into the storage area of the drive for a host environment to access the policies, and understand what policies were applied. Thus ME, PBA and the post-boot authentication environment all know what the policies have been provisioned, e.g., dynamically through a network. In run time, the system can authenticate the user and update authentication state using EFI variables, and so the EFI has variable storage. A HECI driver can communicate with the security firmware and provide the authentication information back to the metadata store in the disk drive. Thus via a runtime environment updated metadata can be stored into the metadata area, such that at a next pre-boot environment, that updated metadata can be discovered in the pre-boot module to ascertain that a user logged in during runtime, changed credentials or so forth.

Figure 5:
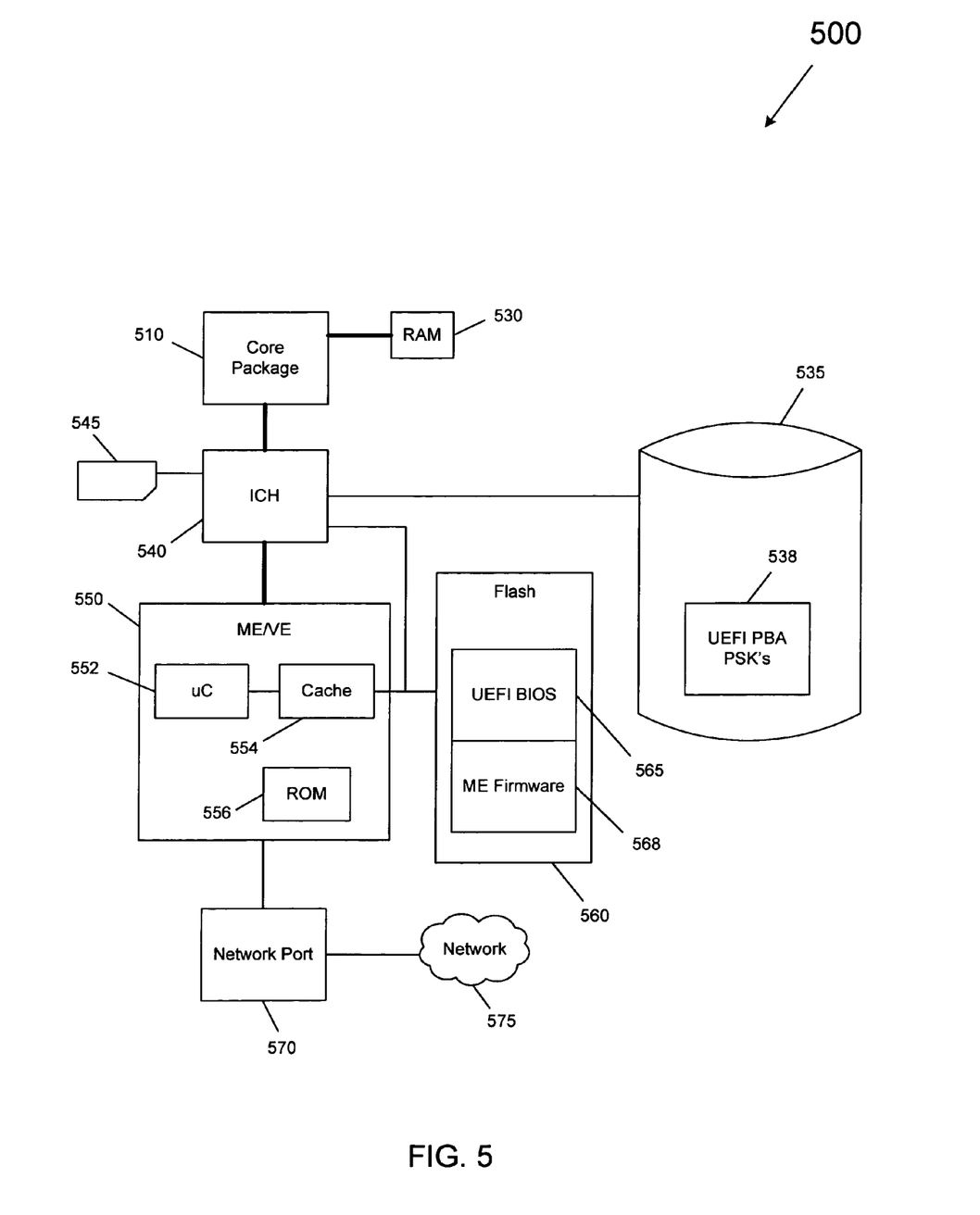
FIG. 5 is a block diagram of a system in accordance with one embodiment of the present invention.

Referring now to FIG. 5, shown is a block diagram of system 500. As shown in FIG. 5, system 500 may include a core package 510, that includes at least one core and is coupled through an integrated memory controller to a system memory 530, which in one embodiment may be a dynamic random access memory (DRAM). Core package 510 is further coupled to an input/output controller hub (ICH), which in turn may be coupled to a hard disk drive such as drive 535, which may be encrypted using FDE. As shown, certain data may be stored in a security-enabled hidden, but unencrypted portion 538. Such data as discussed above may include UEFI PBA images, PSKs and so forth. As further shown in FIG. 5, ICH 540 may be coupled to an integrated smart card 535, such as an integrated trusted platform module (iTPM).

Still further as shown in FIG. 5, ICH 540 may be coupled to a manageability engine/virtualization engine (ME/VE) 550. In one embodiment, ME/VE 550 may be a separate component, or it may be part of ICH 540. In the embodiment shown in FIG. 5, ME/VE 550 includes a microcontroller 552, a cache memory 554, and a read-only memory (ROM) 556. ME/VE 550 may be coupled to a flash memory which may store, in one embodiment UEFI BIOS 565 and ME firmware 568. In turn, ME/VE 550 may be coupled to a network port 570 which in turn couples to a network 575.

As shown in FIG. 5, a remote agent may couple to system 500 remotely through network 575. In this way, the remote agent, which may be an IT personnel or other such remote user, may provision the UEFI PBA remotely. Still further, during such provisioning ME/VE 550 may evaluate a policy against local user settings, credentials in TPM 545 or so forth, to determine whether to allow the remote provisioning, e.g., of hidden storage region 538. While shown with this particular implementation in the embodiment of FIG. 5, the scope of the present invention is not limited in this regard.

By providing the hidden metadata area, rich features of pre-boot authentication can be made available even when legacy OSs are used that do not support EFI. For example, a third party vendor of authentication solutions can provide a pre-boot EFI capability and a post-boot agent can synchronize state between pre- and post-boot by using this metadata storage area to pass synchronization variables. This allows more consistent authentication behavior on platforms even when PBA architecture is limited to EFI compatibility or legacy BIOS implementations and where post-boot environments are limited to non-EFI aware OSs. Thus the PBA image itself can be provisioned out of band, the integrity policy for the PBA can be provisioned and authentication policies such as password strength can be provisioned. Those policies can either be consumed locally by the ME, and they can be forwarded to the pre-boot or the post boot environment by storing it in a hidden metadata region of the drive.

Embodiments thus allow IT personnel to use the user/administrative capability of an implementation of UEFI (e.g., UEFI2.2) and authenticode-signed UEFI system partition on the larger, open disk or into the FAT partition of the protected, hidden metadata region.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   obtaining a pre-boot authentication (PBA) image from a non-volatile storage in a pre-boot environment, wherein the non-volatile storage is configured with full disk encryption (FDE);
   executing the PBA image using an engine of a chipset to obtain user credential information from a user; and
   controlling access to a PBA metadata region of the non-volatile storage using the engine based on the user credential information and stored credential information, and storing the user credential information in the PBA metadata region.

2. The method of claim 1, further comprising receiving a request for the PBA image from a pre-boot software agent, and verifying the PBA image responsive to the request.

3. The method of claim 2, wherein the PBA image comprises a unified extensible firmware interface (UEFI)-hosted PBA, and obtaining the user credential information via a trusted path.

4. The method of claim 3, further comprising publishing credential drivers to enable the UEFI-hosted PBA to access hardware capabilities of the chipset.

5. The method of claim 1, further comprising receiving the user credential information from a first application that executes on an operating system that is unaware of the PBA metadata region, and authorizing the first application to access the PBA metadata region using the engine.

6. The method of claim 5, further comprising updating the stored credential information in the PBA metadata region using the authorized first application.

7. The method of claim 6, further comprising thereafter executing the PBA in a later pre-boot environment, wherein the user credential information to be obtained is of a different security policy responsive to the updated stored credential information.

8. An article comprising a machine-accessible storage medium including instructions that when executed cause a system to:
   receive a request from a pre-boot authentication (PBA) agent in a pre-boot environment of the system to store a PBA context into a PBA region of a non-volatile storage, wherein the PBA region is unencrypted and is hidden from view of non-PBA agents; and
   write the PBA context to the PBA region using security firmware of a chipset coupled to the non-volatile storage.

9. The article of claim 8, further comprising instructions that enable the system to transition from the pre-boot environment to a boot environment and launch an operating system, the operating system unaware of the PBA region and unable to exchange authentication information between the pre-boot environment and a post-boot environment using an extensible firmware interface.

10. The article of claim 9, further comprising instructions that enable the system to:
    receive a request from a post-boot agent to obtain the PBA context; and
    access the PBA context and provide the PBA context to the post-boot agent using the security firmware and without operating system support.

11. The article of claim 10, further comprising instructions that enable the system to receive from the post-boot agent an update to the PBA context in the chipset firmware and to store the updated PBA context in the PBA region.

12. The article of claim 11, further comprising instructions that when executed enable the system to synchronize a state between the pre-boot agent and the post-boot agent using the PBA region to pass synchronization variables therebetween.

13. A system comprising:
    a processor;
    a chipset coupled to the processor and including a first engine to execute a pre-boot authorization module (PBAM); and
    a mass storage coupled to the chipset, the mass storage configured for full disk encryption, wherein the mass storage has an encrypted region and a hidden region to store metadata for the PBAM, wherein the first engine is to access the hidden region to authorize a user during the execution of the PBAM in a pre-boot environment and to store pre-boot authentication (PBA) context in the hidden region.

14. The system of claim 13, wherein the processor is to transition from the pre-boot environment to a boot environment and launch an operating system, the operating system unaware of the hidden region.

15. The system of claim 14, wherein the first engine is to receive a request from a post-boot agent to obtain the PBA context, access the PBA context and provide the PBA context to the post-boot agent without operating system support.

16. The system of claim 15, wherein the first engine is to receive from the post-boot agent an update to the PBA context and store the updated PBA context in the hidden region.

17. The system of claim 15, wherein the first engine is to synchronize a state between the pre-boot agent and the PBAM using the hidden region to pass credential synchronization variables between the pre-boot environment and a post-boot environment.

18. The system of claim 14, wherein the first engine is to re-authorize the user during execution of a first application that executes in a post-boot environment, and authorize the first application to access the metadata.

19. The system of claim 18, wherein the first engine is to update the metadata using the authorized first application.

20. The system of claim 19, wherein the first engine is to execute the PBAM in a later pre-boot environment, wherein the user authorization is of a different security policy responsive to the updated metadata.

* * * * *